June 11, 1968 D. SINCLAIR 3,387,486
METHOD AND APPARATUS FOR DETERMINING THE DEWPOINT
OF A GASEOUS MIXTURE
Filed Dec. 21, 1966
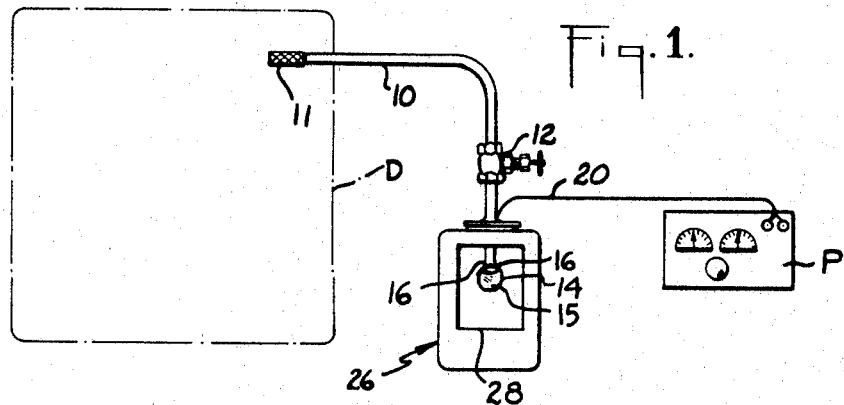
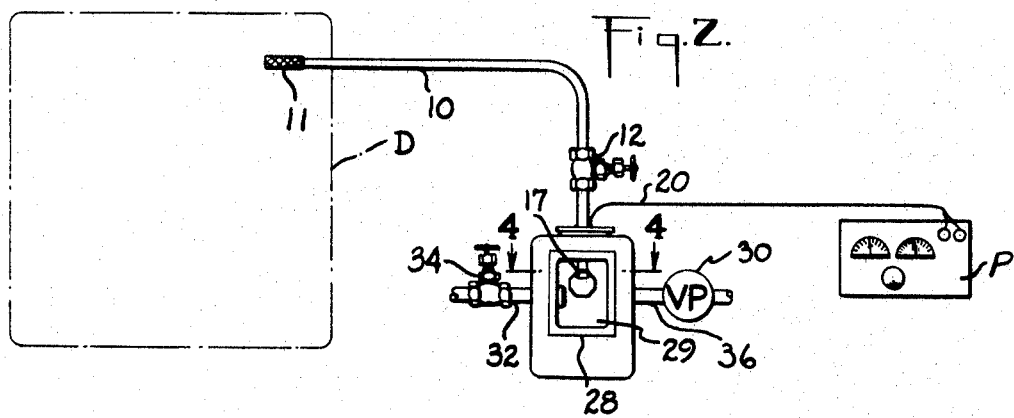
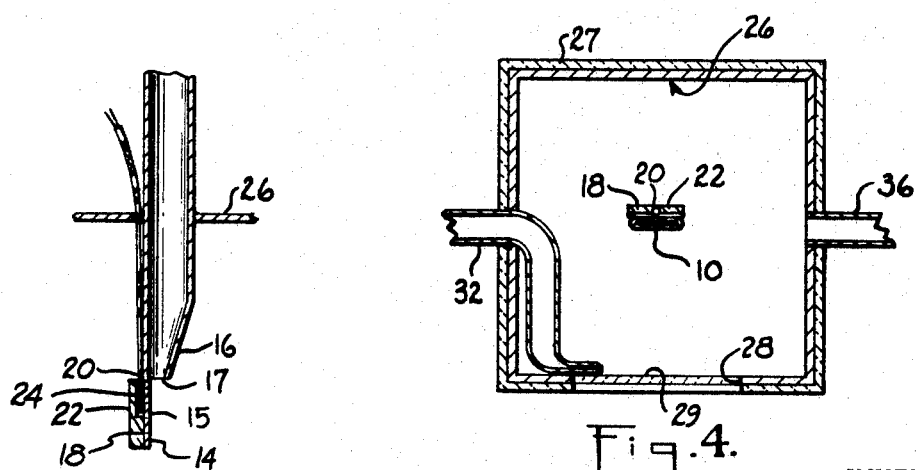
INVENTOR.
DAVID SINCLAIR
BY John B. McKinney
ATTORNEY United States Patent Office 3,387,486
Patented June 11, 1968

3,387,486
METHOD AND APPARATUS FOR DETERMINING THE DEWPOINT OF A GASEOUS MIXTURE
David Sinclair, Martinsville, N.J., assignor to Johns-Manville Corporation, New York, N.Y., a corporation of New York
Filed Dec. 21, 1966, Ser. No. 603,497
8 Claims. (Cl. 73—17)

This invention relates to method and apparatus for determining the dewpoint of a gaseous mixture.

In the conditioning of hygroscopic substances, such as by drying, there is a need to measure and control the moisture or vapor pressure of the gaseous conditioning medium. Measurement of the moisture content in drying process can be quite difficult, particularly at high temperatures (150° F. or greater). The psychrometric method (wet- and dry-bulb) which is sometimes used requires the measurement of two temperatures, the actual (dry bulb) and the evaporating wet surface (wet-bulb). To obtain the correct wet-bulb temperature, the evaporating surface (usually a wick around a thermometer) must be kept thoroughly wet with clean water applied through auxiliary apparatus. The evaporating surface must also be kept free of contamination. Hence, this type of apparatus is limited in use with contaminated atmospheres such as encountered in the drying of dusty wood fiberboard. To obtain correct readings in such psychrometric apparatus, the sensing device must be maintained at the dry-bulb temperature. This places an upper limit on the temperature range for which such instruments can be used.

In other dewpoint instruments, auxiliary cooling means are provided for reducing the temperature of a mirror surface. In one type of such device, a container of volatile liquid is positioned adjacent to a mirror so that the temperature of the mirror is reduced by the evaporative cooling effect of the liquid. In another type of such device, a separate portable supply of compressed gas is provided to cool a mirror surface. Still other devices employ thermoelectric cooling units. Such devices are relatively cumbersome to handle and transport.

An object of this invention is to provide method and apparatus for determining the dewpoint of a gaseous mixture without the need of auxiliary cooling means.

Another object is to provide more facile method and apparatus for determining the dewpoint of heated atmospheres having relatively high dewpoint temperatures and to minimize the work of the attendant operator.

The foregoing objects are accomplished by passing a heated processing gas over the mirror surface and throttling the flow rate of the gas to effect a heat transfer with the mirror surface. The temperature of the mirror is increased over the normal ambient temperature and the temperature of the gas is reduced from the normal processing temperature. The flow rate is throttled within progressively closer limits corresponding to the appearance and disappearance of condensate on the mirror surface, which is indicative of the processing gas dewpoint.

The invention will be more fully understood and further objects and advantages thereof will become apparent with reference to the following detailed description of preferred embodiments of the invention and the accompanying drawing in which:

FIG. 1 is an elevation view of dewpoint determining apparatus made in accordance with this invention and schematically illustrating the probing of a drying oven operating under positive pressure;

FIG. 2 is a view similar to FIG. 1, but of an alternate embodiment which is useful for producing a sampling flow under negative pressure;

FIG. 3 is a cross-sectional view of the mirror shown in FIGS. 1 and 2 illustrating in more detail a thermocouple connection; and FIG. 4 is a fragmentary cross-sectional plan view taken along line 4—4 in FIG. 2.

Referring to the drawing there is shown a conduit line 10 which may extend from a suitable source of supply of a gaseous mixture to be tested. The source of supply may be an oven D used for drying wood fiber products. In such case, where fibrous or dusty materials are being processed, a screen 11 is preferably provided for the inlet of line 10. A valve 12 is provided in the pipe line for selectively varying and controlling the flow rate of the gaseous mixture through the line 10. The line 10 terminates at the surface 15 of mirror 14. Preferably, the terminus 16 of line 10 is somewhat flattened to facilitate distribution and impingement of the moisture laden gas sample across the mirror surface 15. The mirror 14 is preferably of metal and has secured to its back side 18 a thermocouple 20. The thermocouple 20 and the mirror back side 18 are covered with a disc 22, which is preferably of higher thermal conducting metals such as copper, to further facilitate uniform temperature distribution over the mirror 14 and thermocouple 20. Additionally, the disc 22 is grooved to define a pocket 24 for receiving the thermocouple 20 and so that the mirror 14 and the disc 22 may be brought to touching face-to-face relation and preferably soldered together.

The mirror 14 is positioned in a container 26 to shield the mirror 14 from ambient air currents. Optionally, the pipe line 10 and the container 26 may be covered with thermal insulation 27.

When the gas to be tested is provided through line 10 under positive pressure, it is only necessary to shield the mirror surface 15 from direct impingement by ambient air currents. In such case the viewing opening 28 needs no window (transparent closure). The omission of the window obviates the need for auxiliary means to remove or eliminate any fogging or condensation on the window in order to observe the mirror surface 15. FIG. 1 illustrates a device suitable for measuring gas supplied under positive pressure.

When the gas to be tested is provided through line 10 under a vacuum or negative pressure, as by a vacuum pump 30 schematically illustrated in FIG. 2, a transparent closure or window 29 over the viewing opening 28 is needed for the proper functioning of the vacuum system. In this case an auxiliary line 32 is provided to furnish air for keeping the window 29 clear of fog. As may be seen in FIG. 4, the line 32 preferably terminates adjacent to the window 29 to issue a curtain of air opposite the window area opposing the mirror surface 15. The line 32 is also provided with suitable control means, such as a valve 34, for controlling the flow of air forming the clearing air curtain.

To measure the dewpoint of a processing gaseous mixture, such as in a dryer D, the conduit line 10 is probed into the gaseous mixture and the valve 12 opened wide. As the gaseous mixture passes through the conduit line 10 into the container 26, moisture will condense and cloud the mirror surface 15 adjacent to the discharge opening 17 of terminus 16. In the event the processing is not being conducted under positive pressure conditions, it is necessary to apply suction, as through conduit line 36, and by means of vacuum pump 30 (FIG. 2) to induce a flow of processing gas into the container 12 and across the mirror surface 15.

After a short time, sufficient for the heat of the gaseous mixture to heat the mirror surface 15 above the dewpoint, the mirror surface 15 will become clear. The time interval involved will be influenced by factors such as the flow rate of the air being sampled, its temperature, and the insulation on the conduit line 10 and the container 26. After the mirror surface 15 is cleared, the valve 12 is immediately closed and the temperature of the mirror 14 measured and read by means of the thermocouple 20 and a portable potentiometer P, preferably direct reading. After the mirror temperature falls off again due to heat transfer to the cooler surroundings, the valve 12 is throttled within progressively closer limits, while the mirror is observed, to obtain a flow rate where the appearance and disappearance of fog or condensate on the mirror surface 15 is closely controlled. With a little practice, it is possible to measure and read the temperature corresponding to the appearance and disappearance of fog on the mirror surface (the dewpoint or saturation temperature) to within $\pm 1°$ F. If desired the corresponding humidity in pounds of water per pound of dry air may be read from psychrometric tables.

One of the chief advantages of the present invention is that it provides means for measuring gases at highly elevated temperatures, and/or which gases have relatively high dewpoints. Measurements have been made of gases having temperatures in excess of 500° F. and having dewpoint temperatures in excess of 150° F. Most prior art instruments are incapable of handling gases at such high temperatures.

The accurate measuring of gaseous mixtures having dewpoints of 150° F. or greater is particularly important since the conversion curves indicating the humidity corresponding to a given dewpoint become very steep, i.e., a slight variation in temperature produces a relatively large reading difference in humidity. The method and apparatus of this invention provide simple and more facile means for ascertaining such dewpoints without the need of auxiliary cooling devices. Hence the accuracy is not influenced by the skill of the operator in manipulating or by the effectiveness of such auxiliary devices.

What I claim is:

1. The method of determining the dewpoint of a gas which comprises:
   (a) introducing a flow of said gas to a mirror surface having a temperature less than said gas and thereby
   (b) cause moisture in said flow to condense on said surface;
   (c) throttling said flow rate within progressively closer limits corresponding to the appearance and disappearance of moisture on said surface; and
   (b) sensing and observing the temperature of said surface existing when said moisture condenses.

2. The method described in claim 1, which further comprises sensing and measuring the temperature of said surface by means of a thermocouple and a potentiometer.

3. The method described in claim 1, which further comprises:
   (a) flowing said gas, under negative pressure, over a mirror surface positioned within a closed container having a viewing window; and
   (b) circulating a curtain of air adjacent to said viewing window to keep said window clear of fog.

4. Apparatus for sensing the dewpoint temperature of a heated gaseous medium, comprising:
   (a) mirror means defining a mirror surface;
   (b) a sampling probe for conducting said gaseous medium to said mirror surface;
   (c) throttling means for selectively controlling the flow rate of said medium to said mirror surface; and
   (d) a temperature sensing element secured to said mirror means and being arranged to be subject to the influence of temperature changes on said mirror surface,
   (e) said mirror surface being arranged so that its temperature is affected by the flow rate of said medium across said surface.

5. Apparatus as described in claim 4, which further comprises:
   shielding means for shielding said mirror surface from ambient air currents.

6. Apparatus as described in claim 5, wherein:
   at least a portion of said probe and said shielding means is insulated.

7. Apparatus as described in claim 4, which further comprises:
   (a) a container forming a part of said shielding means and having viewing means for viewing said mirror surface; and
   (b) means for circulating a curtain of air adjacent to and to keep said viewing means clear of fog.

8. Apparatus for sensing the dewpoint temperature of a heated gaseous medium, comprising:
   (a) mirror means defining a mirror surface;
   (b) conduit means for conducting said medium to said mirror surface;
   (c) throttle means for selectively varying and controlling the flow rate through said conduit means; and
   (d) temperature sensing means having at least a portion thereof positioned adjacent to said mirror means to provide an indication of the temperature of said mirror surface; and
   (e) said throttle means being adapted to primarily effect temperature changes on said surface by varying the flow rate of said medium across said surface.

References Cited

UNITED STATES PATENTS

| | | | |
|---|---|---|---|
| 2,566,307 | 9/1951 | Boyle | 73—17 |
| 2,709,360 | 5/1955 | Boyle | 73—17 |
| 3,015,228 | 1/1962 | Shuttleworth | 73—17 |
| 3,177,716 | 4/1965 | Warman | 73—335 |

DAVID SCHONBERG, *Primary Examiner.*

D. E. CORR, *Assistant Examiner.*